(12) United States Patent
Youn et al.

(10) Patent No.: US 8,054,440 B2
(45) Date of Patent: Nov. 8, 2011

(54) LIQUID CRYSTAL DISPLAY, MANUFACTURING METHOD THEREOF, AND METHOD FOR TESTING LIQUID CRYSTAL DISPLAY

(75) Inventors: WonGyun Youn, Gyeonggi-do (KR); MyungWoo Nam, Gyeongbuk (KR); BongChul Kim, Daegu (KR); SangMin Park, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 1150 days.

(21) Appl. No.: 11/319,400

(22) Filed: Dec. 29, 2005

(65) Prior Publication Data

US 2006/0146274 A1 Jul. 6, 2006

(30) Foreign Application Priority Data

Dec. 31, 2004 (KR) .................. 10-2004-0118331

(51) Int. Cl.
G02F 1/13 (2006.01)
(52) U.S. Cl. .................... 349/192; 349/54
(58) Field of Classification Search .......... 349/192, 349/54, 149–151
See application file for complete search history.

(56) References Cited

U.S. PATENT DOCUMENTS

| | | | | |
|---|---|---|---|---|
| 6,317,176 | B1 * | 11/2001 | Kim et al. | 349/54 |
| 6,392,719 | B2 * | 5/2002 | Kim | 349/40 |
| 7,372,514 | B2 * | 5/2008 | Matsumoto et al. | 349/55 |
| 7,388,626 | B2 * | 6/2008 | Wu et al. | 349/54 |
| 2002/0085169 | A1 * | 7/2002 | Choi et al. | 349/192 |
| 2004/0095549 | A1 * | 5/2004 | Moon | 349/192 |
| 2005/0206798 | A1 * | 9/2005 | Kim | 349/54 |
| 2008/0198286 | A1 * | 8/2008 | Wu et al. | 349/40 |

FOREIGN PATENT DOCUMENTS

KR 100281058 B1 11/2000
KR 1020030082146 A 10/2003

* cited by examiner

*Primary Examiner* — Thanh-Nhan Nguyen
(74) *Attorney, Agent, or Firm* — Morgan, Lewis & Bockius LLP

(57) ABSTRACT

A liquid crystal display device includes gate pads on a first side of an insulating substrate, gate pad parts, which contain a sub-group of the gate pads, a plurality of gate shorting bars within the gate pad parts, data pads on a second side of the insulating substrate, data pad parts, which contain a sub-group of the data pads, and a plurality of data shorting bars within the gate pad parts.

9 Claims, 8 Drawing Sheets

<ACTIVE REGION TFT>   <DATA PAD REGION>

<ACTIVE REGION TFT>   <GATEPAD REGION>

LIQUID CRYSTAL DISPLAY, MANUFACTURING METHOD THEREOF, AND METHOD FOR TESTING LIQUID CRYSTAL DISPLAY The present invention claims the benefit of Korean Patent Application No. 118331/2004 filed in Korea on Dec. 31, 2004, which is hereby incorporated by reference in its entirety.

BACKGROUND OF THE INVENTION

1. Field of the Invention

The present invention relates to a display device, and more particularly, to a liquid crystal display, a manufacturing method thereof, and a method for testing a liquid crystal display (LCD). Although the present invention is suitable for a wide scope of applications, it is particularly suitable to obtain flexibility in testing an LCD and prevent signal delay during the testing of the LCD.

2. Description of the Related Art

As the modern society changes into an information-oriented society, a liquid crystal display (LCD) device, which is one type of information display device, is receiving more attention. Cathode ray tubes (CRTs), which were widely used up until now, have many advantages in terms of performance and price, but they also have the disadvantages of large size, heavy weight and high power consumption. In contrast, LCDs have the advantages of miniaturization, lightweight, a slim profile, and low power consumption. Therefore, LCDs are drawing more attention as an alternative to CRTs that are capable of overcoming the disadvantages of the CRTs.

The fabrication of LCDs includes a process of manufacturing a lower substrate in which thin film transistors (TFTs) are formed, a process of manufacturing an upper substrate in which a color filter layer is formed, a cell process for attaching the lower substrate and the upper substrate as well as injecting liquid crystal (LC) into a space therebetween, a module process of assembling a printed circuit board (PCB) and the like for driving of the LCD, and an assembling process for assembling a backlight unit and optical sheets to the LCD.

A failure test processes are performed in each of the above processes. First, when the lower substrate having the TFTs therein is completed, an array test is performed to test for TFT failure, pixel pattern failure, and line opening failure. Then, a liquid crystal (LC) panel test process is performed to test whether there is a failure in the LC panel after attaching the upper and lower substrates. The LC panel test process is also called a cell test process.

The LC panel test process is for determining the presence of several malformations, such as defects in optical characteristics in the active region of the LC panel caused by a foreign substances or by variations in material thickness within the active region, point defects caused by TFT failure, and line defects caused by an opening failure in gate lines and/or data lines. The advantages and disadvantages of an auto probe (A/P) used for testing the LC panel according to the related art will now be described.

A first type of test that includes an A/P pin test can be performed by contacting needle pins to all of data pads and gate pads of the LC panel after the upper and lower substrates are attached to each other and a grinding process is completed. Since the A/P pin test applies signals to all of the data pads and the gate pads, which are contacted with the needle pins, there is an advantage in that the test can be performed by applying test signals in the same manner as real signals would be applied in the actual driving of the LCD. However, since the A/P pin test has needle pins that need to contact each of the pads, once a contact failure occurs at one of the pads by one of the needle pins, a line defect is falsely detected. Another disadvantage is that a jig of needle pins used for contacting all of data pads and gate pads of the LC panel has to be manufactured for each model of LC panel. Further, such a test requires two or more operators.

A second type of test that includes the combination of an A/P pin test and a vision test that allows the needle pins to contact each of the gate pads and the data pads, and then tests the point defect and the line defect using a macro/micro (MAC/MIC) test system so as to overcome a disadvantage of the A/P pin test. More specifically, the A/P pin test and the vision test have an advantage in that only one operator is required in comparison to the related art A/P pin test but still do not solve the problem of false line defect detections due to pin contact failure.

A third type of test that includes a shorting bar test and the vision test has been developed to solve the disadvantages of the A/P pin test and the vision test. The shorting bar test and the vision test combine all of the even and odd gate pads together as well as all of the even and odd data pads together using shorting bars, and applies test signals to each of the gate and data lines to test the LC panel. The shorting bar test and the vision test will be described below with reference to FIG. 1.

FIG. 1 is a schematic view of a test for an LC panel according to the related art. As shown in FIG. 1, the LC panel 10 on which a gate pad part 17 and a data pad part 16 are formed is moved by a moving unit of an A/P pin system to a test area in which a data driver 11 and a gate driver 12 are disposed. The data driver 11 has a plurality of data test probes 14 and the gate driver 12 has a plurality of gate test probes 15. The data test probe 14 includes a data tape carrier package (TCP) on which a data driver IC is mounted, and a plurality of needle pins for electrical contact with shorting bars formed in the data pad part 16. Similarly, the gate test probe 15 includes a gate TCP on which a gate driver IC is mounted, and a plurality of needle pins for electrical contact with shorting bars formed in the gate pad part 17. The needle pins formed in the data test probes 14 and the gate test probes 15 contact even and odd shorting bars formed along the edge of the LC panel 1 and apply drive signals and data signals to the shorting bars of the LC panel 10 so as to perform a failure test, such as a line defect test and a point defect test.

FIG. 2 is a schematic view of a pad structure in an LC panel for the LC panel test shown in FIG. 1. As shown in FIG. 2, the LC panel 10 having the upper substrate and the lower substrate attached to each other is roughly divided into a pad region 10a and an active region 10b. The active region 10b includes red (R), green (G), and blue (B) pixels formed in a matrix. The pad region 10a includes a data pad region 16 and a gate pad region 17 at sides thereof. The data pad region 16 includes data pads D1, D2, D3, D4, . . . extending to an edge of the pad region 10a for applying data signals to the R, G, and B pixels. The gate pad region 17 includes gate pads G1, G2, G3, . . . extending up to another edge of the pad region 10a for applying drive signals to the R, Q and B pixels.

For the shorting bar and vision tests, the pad region 10a includes an odd data shorting bar DS1 that connects to all of the odd data pads D1, D3, D5, . . . among the data pads D1, D2, D3, D4, D5, D6, . . . and an even data shorting bar DS2 that connects to all of the even data pads D2, D4, D6, . . . among the data pads D1, D2, D3, D4, D5, D6, . . . . Likewise, the pad region 10a also includes odd gate shorting bar GS1 that connects to all of the odd gate pads G1, G3, G5 . . . and even gate shorting bar GS2 that connects to all of the even gate pads G2, G4, G6, . . . . Shorting bar terminals of the gate shorting bars GS1 and GS2 and the data shorting bars DS1 and DS2 are formed at the opposite ends of the gate pad region 17 and at the opposite ends of the data pad region 16, respectively. As illustrated in FIG. 2, a cutting line 20 is used for electrically cutting the data shorting bars and the gate shorting bars DS1, DS2, GS1, and GS2 away from the data pads D1, D2, D3, . . . and the gate pads G1, G2, G3, . . . after the test. A process of performing the shorting bar and vision test will be described below using the LC panel 10 having the above structure.

Since the odd data shorting bar DS1 and the even data shorting bar DS2 connect all of data pads D1, D2, D3, . . . , the test is performed by having needle pins that only contact the terminals of the data shorting bars DS1 and DS2, unlike the related art A/P pin test. The shorting bars can be contacted at both ends for redundancy purposes. A test for a defective LC panel 10 is performed by applying data signals and drive signals to the shorting bars DS1, DS2, GS1, and GS2. The above test, which is similar to a test for the TFT array substrate, is a test in which the data pads and the gate pads are all grouped odd/even by the shorting bars and test signals are applied to all of the odd/even shorting bars with collective contact to all even/odd lines through respective even/odd shorting bars. Therefore, pin-contact failure is reduced as compared to the related art A/P pin test. Further, a separate jig is not required for each model of the LC panels because at most only 8 contacts, which can be spatially adjustable, are necessary.

The shorting bar and vision tests have the following problems. First, since the even/odd shorting bar test applies a signal to the shorting bar terminals disposed at opposite ends of the shorting bars during the test, a false line defect may be detected due to a signal delay to the central region of the LC panel. Second, since all of the lines are grouped as even/odd and the even pixels or odd pixels are tested collectively, the flexibility to be able to individually test each pixel or a small number of pixels is considerably deteriorated. That is, since signals are not applied to all of the pads to perform the test in the same manner as is done in the LCD driving of the related art A/P pin test, there are limitations in being able to accurately determining the locations and/or causes of failures.

SUMMARY OF THE INVENTION

Accordingly, the present invention is directed to a liquid crystal display, a manufacturing method thereof, and a method for testing a liquid crystal display (LCD) that substantially obviate one or more problems due to limitations and disadvantages of the related art.

An object of the present invention is to provide an LCD, a manufacturing method thereof, and a method for testing an LCD, that can secure a test margin of an LCD panel and to solve a signal delay problem generated during testing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display device including gate pads on a first side of an insulating substrate, gate pad parts, which contain a sub-group of the gate pads, a plurality of gate shorting bars within the gate pad parts, data pads on a second side of the insulating substrate, data pad parts, which contain a sub-group of the data pads, and a plurality of data shorting bars within the gate pad parts.

In another aspect of the present invention, a method for testing a liquid crystal display device includes contacting a plurality of gate shorting bars within gate pad parts in which each contains a sub-group of gate pads, contacting a plurality of data shorting bars within data pad parts in which each contain a sub-group of data pads, and testing the liquid crystal display device by applying a drive signal to at least one of the plurality of gate shorting bars and at least one of the plurality of data shorting bars.

In yet another aspect of the present invention, a method for manufacturing an LCD includes forming gate electrodes and gate pads on an insulation substrate, forming a plurality of gate shorting bars within gate pad parts in which each contains a sub-group of gate pads, forming thin film transistors and data pads, and forming a plurality of data shorting bars within data pad parts in which each contain a sub-group of data pads.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a portion of an LC panel for explaining a method of testing an LC panel having a pad structure according to embodiments of the present invention.

DETAILED DESCRIPTION OF THE INVENTION

Reference will now be made in detail to the preferred embodiments of the present invention, examples of which are illustrated in the accompanying drawings.

Figure 1:
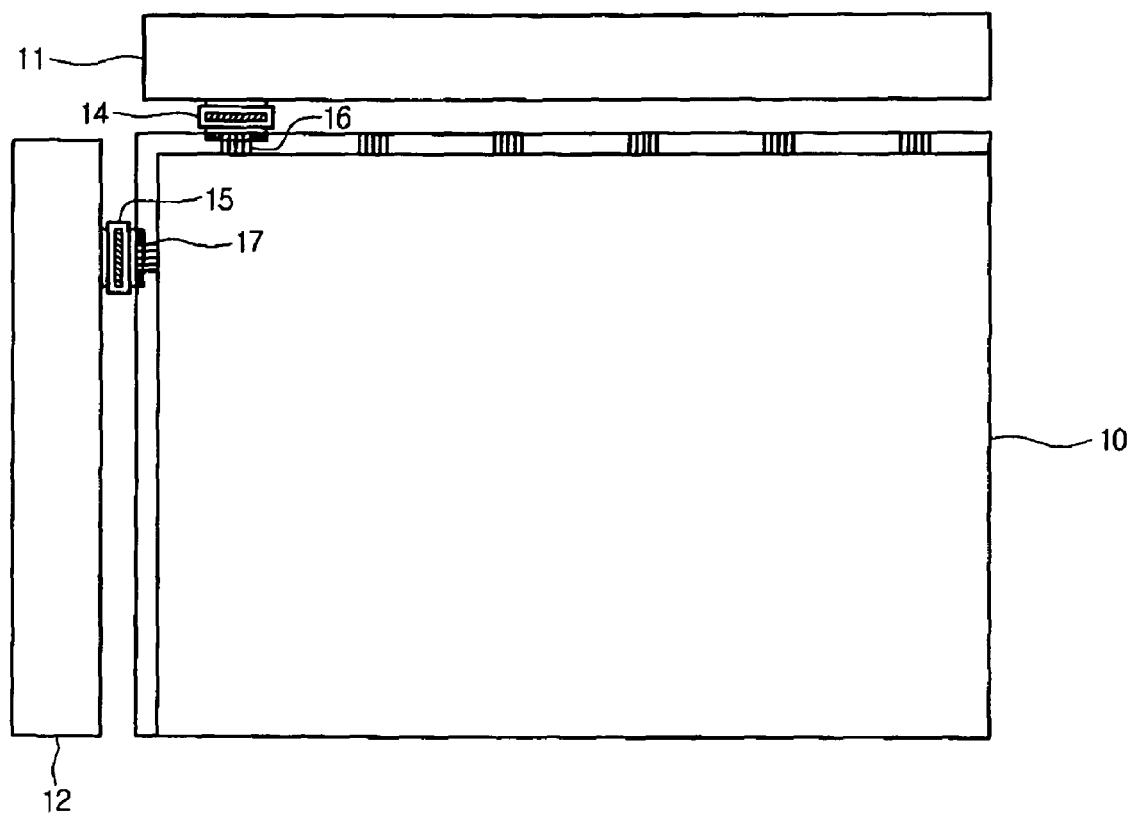
FIG. 1 is a schematic view of an LCD test according to the related art.
Figure 2:
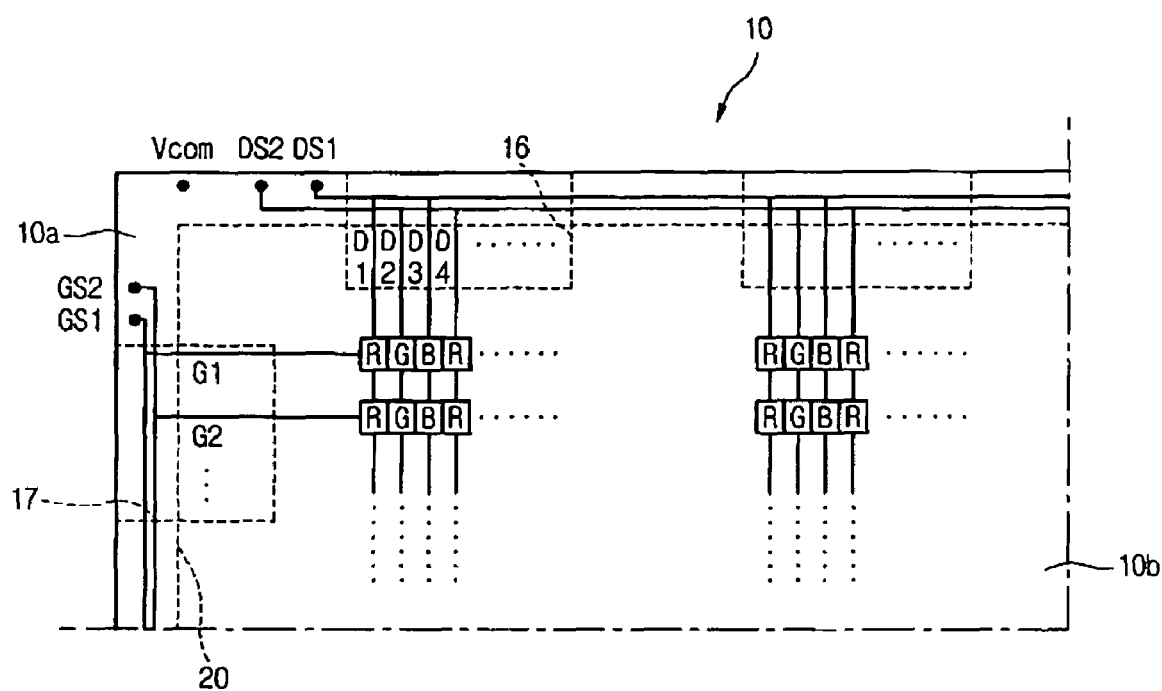
FIG. 2 is a schematic view of a pad structure in an LC panel for the LC panel test shown in FIG. 1.
Figure 3:
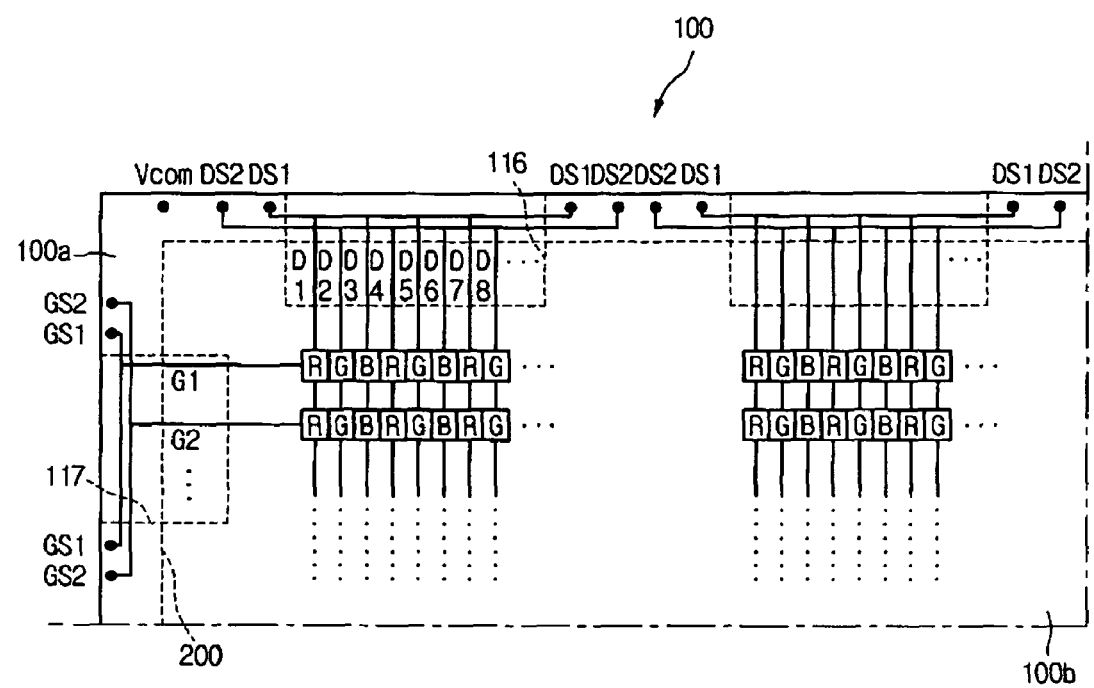
FIG. 3 is a schematic view of a pad structure in an LC panel for an LCD test according to an embodiment of the present invention.

FIG. 3 is a schematic view of a pad structure in an LC panel for an LCD test according to an embodiment of the present invention. As shown in FIG. 3, the LC panel 100, including an upper substrate and a lower substrate attached to each other, is divided into a pad region 100a in which a plurality of gate pads G1, G2, . . . are formed at one side and a plurality of data pads D1, D2, . . . are formed at another side, an active region 100b having a plurality of gate bus lines extending from the gate pads G1, G2, . . . as well as a plurality of data bus lines extending from the data pads D1, D2 . . . for displaying an image. A reference numeral 200 shown in FIG. 3 is a trimming line where a portion of the upper substrate was removed such that a portion of the lower substrate could be revealed. Further, the active region 100b includes red (R), green (G), and blue (B) pixels formed in a matrix configuration. In addition, the pad region 100a includes a plurality of data pad parts 116 and a plurality of gate pad parts 117.

Each of the data pad parts 116, which is an area in which the data pads D1, D2, D3, . . . are bundled into one sub-group, includes data pads D1, D2, D3, D4, . . . extending to an edge of the pad region 100a for applying data signals to the R, G, and B pixels. Each of the gate pad parts 117, which is an area in which the gate pads G1, G2, G3, . . . are bundled into one sub-group, includes gate pads G1, G2, G3, . . . extending to the edge of the pad region 100a and applying drive signals to the R, G, and B pixels. Also, the pad region 100a includes odd data shorting bars DS1 that each respectively connect odd data pads D1, D3, D5, . . . in the sub-group of data pads within each of the data pad parts 116, and an even data shorting bar DS2 that each respectively connect even data pads D2, D4, . . . in the sub-group of data pads within each of the data pad parts 116. Similarly, the pad region 100a includes odd gate shorting bars GS1 that each respectively connect to odd gate pads G1, G3, G5, . . . in the sub-group of gate pads within each of the gate pad parts 117, and an even gate shorting bars GS2 that each respectively connect to even gate pads G2, G4, in the sub-group of gate pads within each of the gate pad parts 117.

The odd data shorting bars DS1 and the even data shorting bars DS2 are in each of the data pad parts are independent and separate from each other. That is, terminals of the data shorting bars are formed at the opposite ends of each data pad part 116, and the data shorting bars disposed adjacent to each other at the different data pad parts are electrically disconnected from each other. Likewise, the odd gate shorting bar GS1 and the even gate shorting bar GS2 are in each of the gate pad parts are separate and independent from each other. Therefore, the odd gate pads G1, G3, . . . and the even gate pads G2, G4, . . . in a gate pad part are only respective connected in an alternating fashion to the odd gate shorting bars GS1 and the even gate shorting bars GS2 for that gate pad part 117. Also, the odd data pads D1, D3, . . . and the even data pads D2, D4, . . . in a data pad part are only respectively connected in an alternating fashion to the odd data shorting bars DS1 and the even data shorting bars DS2 for that data pad part.

A process of performing the shorting bar and vision tests using the LC panel 100 having the above construction will now be described. In a shorting bar and vision tests system according to an embodiment of the present invention, the A/P pins (needles) contact the odd/even gate shorting bars GS1 and GS2 connecting the sub-groups of odd/even gate pads in each of the gate pad parts 117, and the odd/even data shorting bars DS1 and DS2 connecting the sub-groups of odd/even data pads in each of the data pad parts 116. After the contacting, test signals are applied to each of the data shorting bars DS1 and DS2, and the gate shorting bars GS1 and GS2 to test whether the LC panel has a defect. Since the shorting bars DS1, DS2, and GS1, GS2 are independently separated in both the data pad part and in the gate pad part, respectively, the defect test of the LC panel can be performed on a specific sub-group of pads.

All of the gate pads and the data pads in each gate pad part 117 and each data pad part 116 of the plurality of gate pad parts 117 and the data pad parts 116 are tested according to the odd/even test. When a test signal is applied in unit of odd/even gate/data pads, to all of the gate pad parts 117 and the data pad parts 116, the test can be performed in the same manner as is done in the related art odd/even shorting bar test. Also, a partial test can be performed by selecting desired pad parts and applying a drive signal to only the gate shorting bars GS1 and GS2 or the data shorting bars DS1 and DS2 corresponding to the selected pad parts. That is, when a drive signal is applied to the shorting bars corresponding to the third pad part of the gate pad parts 116 and the fourth pad part of the data pad parts 117, the test can be performed only with respect to the desired block. Therefore, the test using the shorting bar according to embodiments of the present invention can achieve degree of flexibility similar to that of the related art test using A/P pin contact of all pads. Also, since test signal are applied to a sub-group of pads in embodiments of the present invention, false line defect detection caused by signal delay can be prevented.

Figure 4A:
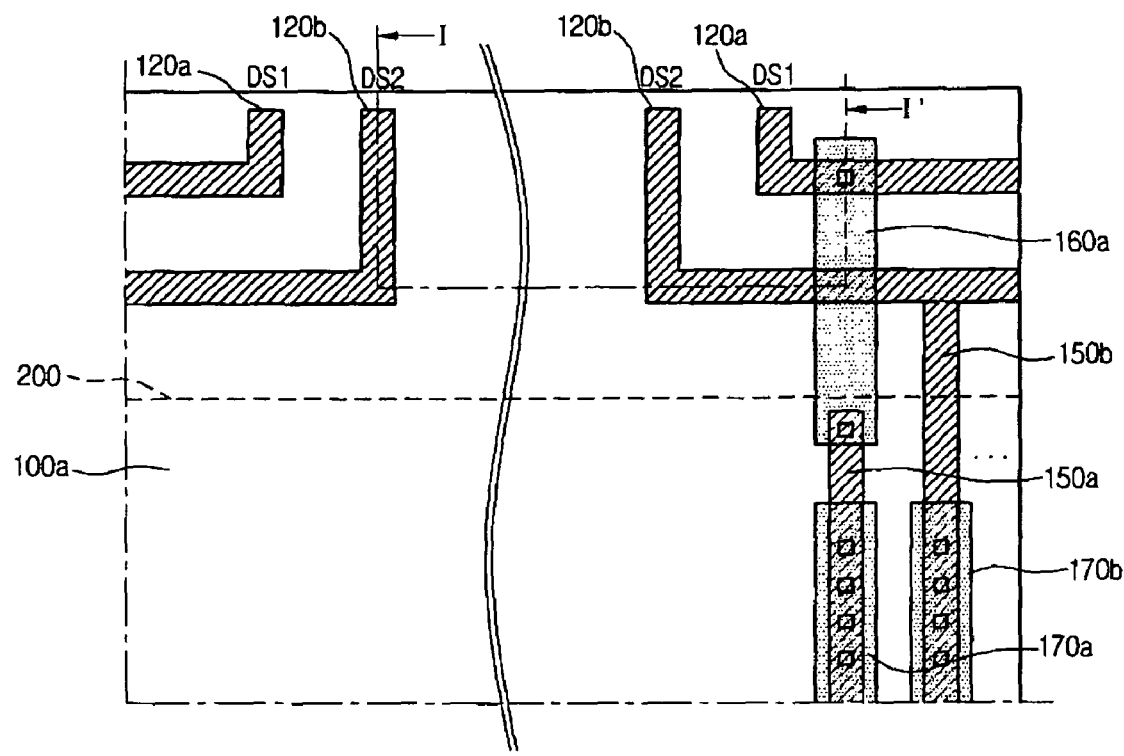
FIG. 4A is an enlarged view of a data pad part region of FIG. 3.
Figure 4B:
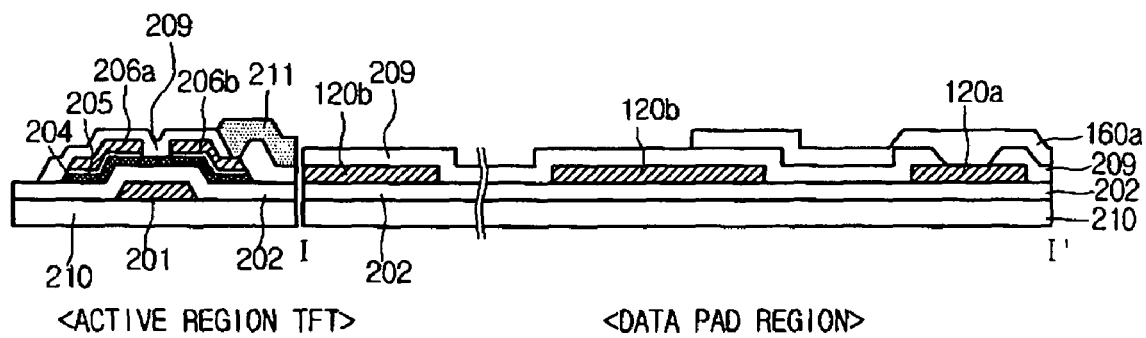
FIG. 4B is a cross-sectional view taken along the line I-I' of FIG. 4A.

FIG. 4A is an enlarged view of a data pad part region in FIG. 3, and FIG. 4B is a cross-sectional view taken along the line I-I' of FIG. 4A. As shown in FIG. 4A, the odd/even data shorting bars DS1 (120a), DS2 (120b) formed in data pad parts of the pad region 100a in the LC panel 100, and the first and second data leads 150a and 150b are connected to the odd and even data shorting bars 120a and 120b, respectively. The first and second data contact pads 170a and 170b contact the first and second data leads 150a and 150b, respectively. The odd data shorting bar 120a is electrically connected with the first data lead 150a using a data connection crossover 160a formed of transparent metal, with the even data shorting bar 120b thereunder. That is, the first data lead 150a and the odd data shorting bar 120a are simultaneously formed but patterned to be electrically opened from each other, and afterward, they are connected by the data connection crossover 160a during a process of forming a pixel electrode (refer to 211 in FIG. 4B). However, the even data shorting bar 120b and the second data lead 150b are integrally patterned and electrically connected with each other.

A process of forming the shorting bars during a process of manufacturing an LCD will be described in detail with reference to FIG. 4B, which illustrates the cross-section of a TFT in an active region 100b of FIG. 3 and the cross-section of the pad region 100a of FIG. 4A taken along the line I-I'. First, a gate electrode 201 is formed on a transparent insulation substrate 210, and the odd/even gate shorting bars GS1 and GS2 (refer to FIG. 3) are independently formed in a plurality of gate pad parts 117 each containing a plurality of gate pads as a sub-group on the transparent insulation substrate 210. Subsequently, a gate insulation layer 202 is formed over the insulation substrate 210 and the gate electrode 201.

A process of forming the odd/even gate shorting bars will be described in detail with reference to FIGS. 4A and 4B. After the gate insulation layer 202 is formed on the insulation substrate 210, a channel layer 204 is formed on the gate insulation layer 202 in the active region, and subsequently, a source electrode 206a, a drain electrode 206b, and an ohmic contact layer 205 of the TFT are sequentially formed. The first and second data contact pads 170a and 170b are formed on the first and second data leads 150a and 150b, respectively, in the data pad region. The data pads are sub-grouped into a plurality of data pad parts, each having a plurality of data pads such that a plurality of odd/even data shorting bars 120a and 120b are formed in each of the plurality of data pad parts 116. In each data pad part, the odd data shorting bar 120a is connected to the odd data pads and the even data shorting bar 120b is connected to the even data pads.

When the manufacturing of the TFT is completed, a passivation layer 209 is formed over the entire region of the insulation substrate 210, and then a contact hole formed therein. In forming the contact hole, the drain electrode 206b is partially exposed for electrical contact with the pixel electrode 211, which will be formed later. Also, the upper portions of the first data lead 150a and odd data shorting bar 120a are partially exposed. Next, a transparent metal layer is formed on the entire region of the insulation substrate 210 and etched to form pixel electrodes 211. Also, a data connection crossover 160a electrically connecting the first data lead 150a with the odd data shorting bar 120a is formed.

Figure 5A:
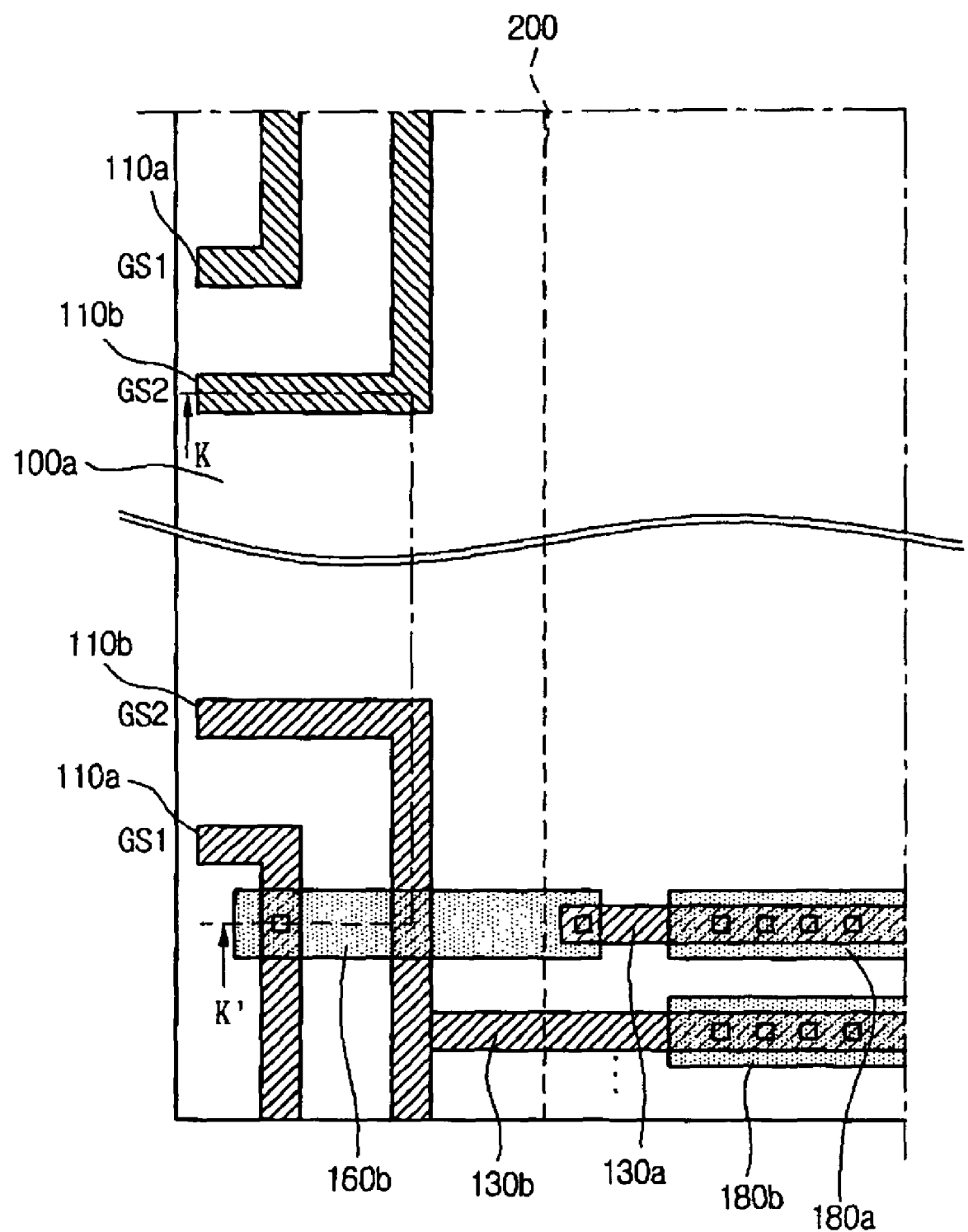
FIG. 5A is an enlarged view of a gate pad part in FIG. 3.
Figure 5B:
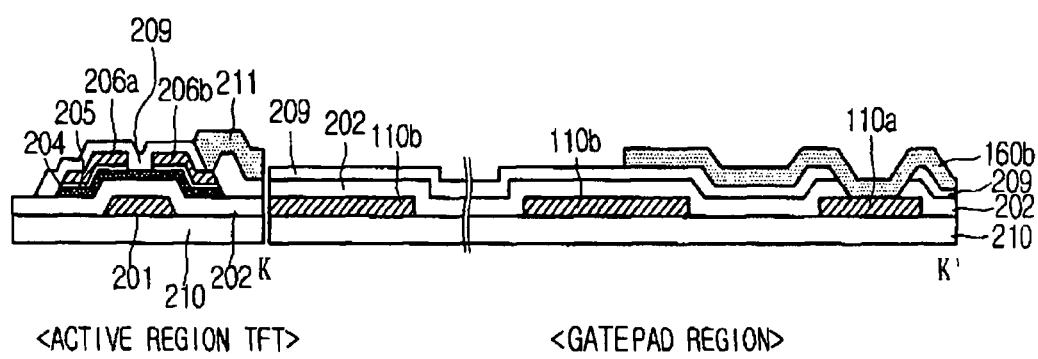
FIG. 5B is a cross-sectional view taken along the line K-K' of FIG. 5A.

FIG. 5A is an enlarged view of a gate pad part region of FIG. 3. FIG. 5B is a cross-sectional view taken along the line K-K' of FIG. 5A. FIG. 5A illustrates the odd/even gate shorting bars GS1 (110a), GS2 (110b) in gate pad parts 117. Further, the first and second gate contact pads 180a and 180b are connected to the first and second gate leads 130a and 130b, respectively. The odd gate shorting bar 110a is electrically connected to the first gate lead 130a using a gate connection crossover 160b formed of transparent metal with the even gate shorting bar 110b interposed thereunder. That is, the first gate lead 130a and the odd gate shorting bar 110a are simultaneously formed, but they are patterned to be electrically disconnected from each other when the gate lead is formed, and afterward, they are connected by the gate connection crossover 160b during a process of forming a pixel electrode (refer to 211 in FIG. 5B). However, the even gate shorting bar 110b and the second gate lead 130b are integrally patterned and are electrically connected with each other.

FIG. 5B illustrates the cross-section of a TFT in the active region 100b of FIG. 3 and a cross-sectional view of the pad region 100b taken along the line K-K' of FIG. 5A. First, a gate electrode 201, gate pads 180a and 180b, the odd/even gate shorting bars GS1 (110a) and GS2 (110b) and the first and second gate leads 130a and 130b, as shown in FIG. 5A are formed on the transparent insulation substrate 210. Subsequently, a gate insulation layer 202 is formed over the transparent insulation substrate 210. The odd/even gate shorting bars GS1 (110a) and GS2 (110b) are independently formed in a plurality of gate pad parts 117 each containing a plurality of gate pads as a sub-group on the transparent insulation substrate 210. An odd gate shorting bar 110a and an even gate shorting bar 110b respectively connecting the gate leads 130a and 130b are formed in each gate pad part. Therefore, the odd gate shorting bars 110a and the even gate shorting bar 110b are independently formed in each of the gate pad parts 117.

Subsequently, a channel layer 204 is formed on the insulation substrate 210 where the gate insulation layer 202 is formed in the active region, and subsequently, a source electrode 206a, a drain electrode 206b, and an ohmic contact layer 205 of the TFT are sequentially formed. In the gate pad region, the gate insulation layer 202 is formed on the insulation substrate 210 where the odd gate shorting bar 110a and the even gate shorting bar 10b are formed.

When the manufacturing of the TFT is completed in the active region as described above, a passivation layer 209 is formed over the entire region of the insulation substrate 210, and then a contact hole process is performed. In the contact hole process, the drain electrode 206b is partially exposed for electrical contact with the pixel electrode 211, which will be formed later. As explained with reference to FIGS. 4A and 4B, a contact hole is formed for electrical contact between the odd data shorting bar 120a and the first data lead 150a. Also, a contact hole for electrically connecting the odd gate shorting bar 110a with the first data lead 130a is formed. After that, a transparent metal layer is formed on the entire region of the insulation substrate 210 and etched so that the pixel electrode 211, the data contact pad, the data connection pads 4b (FIG. 4A), and a gate connection pad 160b for electrical connection between the odd gate shorting bar 110a and the first gate pad 130a are formed.

Figure 6:
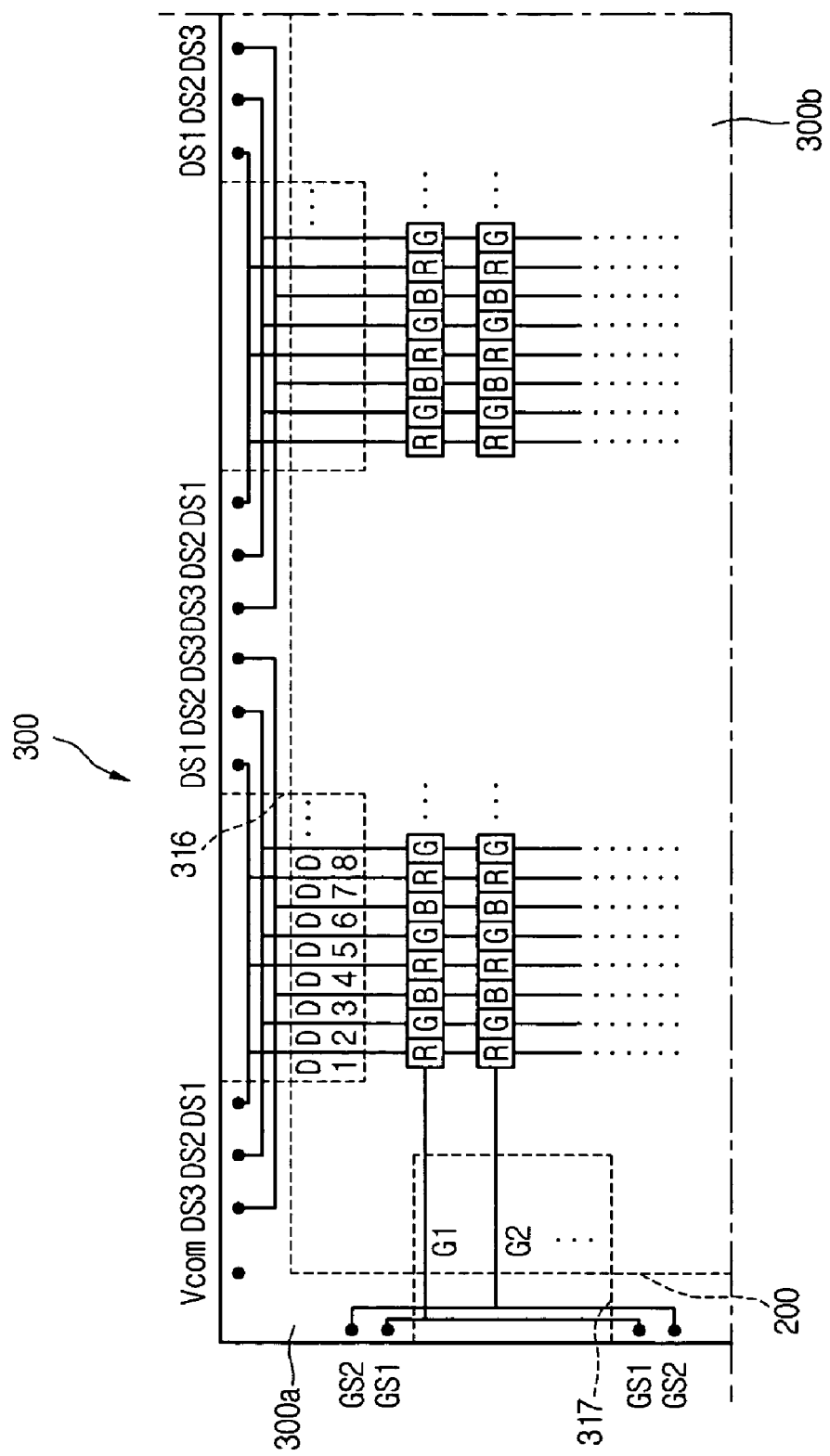
FIGS. 6 and 7 are schematic views of a pad structure in an LC panel according to another embodiment of the present invention.
Figure 7:
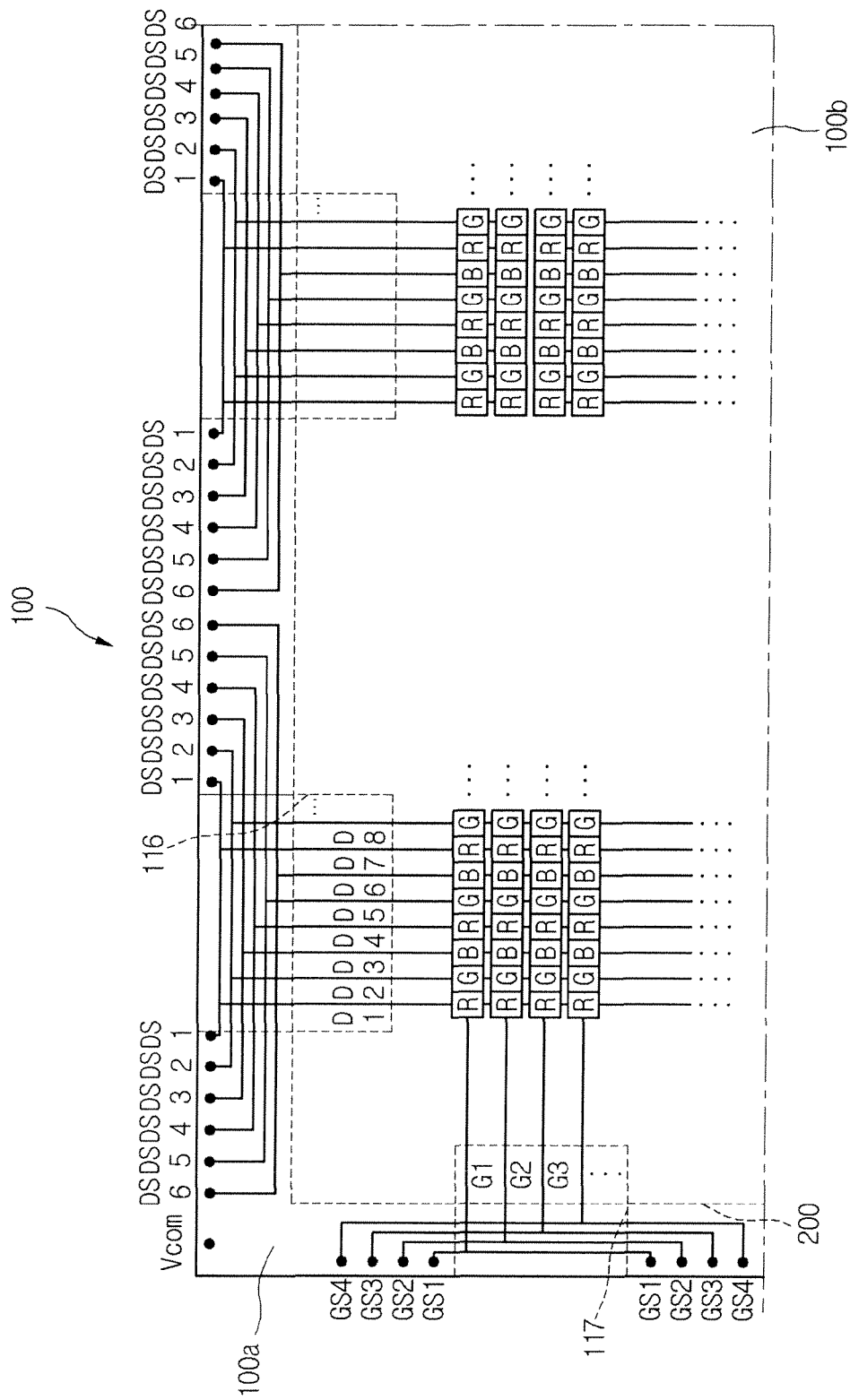

Although the previous description is with regard to the case where only odd and even shorting bars are formed in the pad parts, as shown in FIGS. 4A, 4B, 5A, and 5B, the manufacturing process for more shorting bars in each pad part is the same. In the alternative, three, four, or more shorting bars can be provided in the gate pad or the data pad. Further, the can be a different number of shorting bars in the gate pad than in the data pad, as shown in FIGS. 6 and 7. Therefore, the above-described method for manufacturing the LCD can be directly applied to the LCD where many shorting bars are formed.

FIGS. 6 and 7 are views illustrating a pad structure of an LC panel according to another embodiment of the present invention. As shown in FIG. 6, an odd gate shorting bar GS1 and an even gate shorting bar GS2 are respectively formed in each of the gate pad parts 317, which are sub-groups of gate pads. Also, a first data shorting bar DS1, a second data shorting bar DS2, and a third data shorting bar DS3 are connected to data pads D1, D2, D3, D4, D5, . . . such that the three shorting bars are respectively connected to Red, Green, and third pixels in each of the plurality of data pad parts, which are sub-groups of data pads 316. The odd/even gate shorting bars GS1 and GS2 in each of the gate pad parts 317 are similar to those described in reference to FIG. 3 and are electrically separated from other odd/even gate shorting bars GS1 and GS2 formed in an adjacent gate pad part. The odd gate pads G1, G3, . . . and the even gate pads G2, G4, . . . in a gate pad part are only respective connected in an alternating fashion to the odd gate shorting bar GS1 and the even gate shorting bar GS2 for that gate pad part 317.

The first, second, and third data shorting bars DS1, DS2, and DS3 are formed in each of the data pad parts and are electrically isolated from the first, second, and third data shorting bars DS1, DS2, and DS3 formed in adjacent data pad parts 316. Also, the first data shorting bars DS1 are connected with the data pads that correspond to the Red pixels in the data pad parts of the active region 300b. The second data shorting bars DS2 are connected with the data pads that correspond to the Green pixels and the third data shorting bars DS3 are connected to the Blue pixels. That is, the three data shorting bars DS1, DS2, and DS3 are sequentially and repeatedly connected with the data pads D1, D2, D3, D4, . . . , which sequentially and repeatedly correspond to Red, Green, and Blue pixels in each data pad part.

The data pads D1, D2, D3, D4, . . . of a data part in FIG. 6 are not divided into odd pads and even pads, but instead, they are separated into the first, second, and third pads corresponding with the Red, Green, and Blue pixels (exactly, in unit of three pixels) of a data part and are connected with the first, second, and third data shorting bars DS1, DS2, and DS3. Therefore, a test signal can be applied in various ways compared with the odd/even shorting test, so that accuracy in determining problem areas can be increased. Further, color tests can be implemented for finding problems. Since the LC panel 300 having the above structure includes the shorting bars formed corresponding to pixels, not only is test signal delay prevented but additional testing regiments using color can be implemented.

Referring to FIG. 7, the first, second, third, and fourth gate shorting bars GS1, GS2, GS3, and GS4 are independently formed in each gate pad part 417 such that a plurality of gate pads G1, G2, G3, G4, G5, G6 . . . are divided into four blocks in each gate pad part, which is a sub-group of all gate pads. In a data pad part 416, data pads D1, D2, D3, D4, D5, D6, D7, . . . are blocked into first, second, third, fourth, fifth, and sixth data pad blocks corresponding to two RGB pixels, and the six blocks of data pads are connected to the first, second, third, fourth, fifth, and sixth data shorting bars DS1, DS2, DS3, DS4, DS5, and DS6, respectively. As shown in FIG. 7, the first, second, third, and fourth gate shorting bars GS1, GS2, GS3, and GS4 are connected to every first line through fourth line of the gate pads G1, G2, G3, and G4 in succession. For example, some gate pads 417 are connected to the first gate shorting bar GS1 in the order of the first gate pad G1, the fifth gate pad G5, the ninth gate pad G9, . . . while other gate pads are connected to the second gate shorting bar GS2 in the order of the second, sixth, and tenth gate pads G2, G6, G10, . . . . The first, second, third, and fourth gate shorting bars GS1, GS2, GS3, and GS4 are electrically isolated from each other and are electrically isolated from the first, second, third, and fourth gate shorting bars GS1, GS2, GS3, and GS4 formed in an adjacent gate pad part.

The first, second, third, fourth, fifth, and sixth data shorting bars DS1, DS2, DS3, DS4, DS5, and DS6 formed in a data pad part 416 and are electrically isolated from each other and are electrically isolated from the first, second, and third data shorting bars DS1, DS2, and DS3 formed in an adjacent data pad part. The first, second, third, fourth, fifth, and sixth data shorting bars DS1, DS2, DS3, DS4, DS5, and DS6 divide data pads D1, D2, D3, D4, D5, D6, . . . formed in the active region 400b into first, second, third, fourth, fifth, and sixth blocks (in unit of RGBRGB pixels in the drawing) and sequentially connect the sub-group of data pads. That is, the six data shorting bars DS1, DS2, DS3, DS4, DS5, and DS6 sequentially and are repeatedly connected to groups of the data pads D1, D2, D3, D4, D5, D6, . . . formed in the data pad part 416. For example, the first, seventh data pads D1, D7, . . . are connected with the first data shorting bar DS1; the second, eighth data pads D2, D8, . . . are connected with the second data shorting bar DS2; the third, ninth data pads D3, D9, . . . are connected with the third data shorting bar DS3; the fourth, tenth data pads D4, D10, . . . are connected with the fourth data shorting bar DS4; the fifth, eleventh data pads D5, D11, . . . are connected with the fifth data shorting bar DS5; and the sixth, twelfth data pads D6, D12, . . . are connected with the sixth data shorting bar DS6.

As described with reference to FIG. 4, the data pads D1, D2, D3, D4, . . . are can divided by R, Q and B pixels in units of three pixels or six pixels so that a test signal can be applied to the LC panel in various ways. Therefore, since the LC panel 400 of the above structure has the shorting bars formed described above, not only are test parameters secured but also test signal delay can be prevented. Also, the data pads D1, D2, D3, D4, . . . can be sub-grouped into blocks of 2, 3 or 6, so that a more accurate test can be performed. That is, the more the gate pads G1, G2, G3, . . . and/or the data pads D1, D2, D3, . . . are divided into a larger number of blocks, the more accurate the pin contact test is for the LCD device.

FIG. 8 is a view explaining a method for testing an LC panel according to a pad structure of an LC panel in an embodiment of the present invention. As shown in FIG. 8, a test signal is applied to desired pad parts of gate pad parts GC1, GC2, GC3, and GC4, and data pad parts DC1, DC2, DC3, DC4, DC5, DC6, DC7, and DC8 in the active region of the LC panel, so that a failure test can be performed for the desired portions. Since shorting bars are independently formed within the gate pad parts and the data pad parts as illustrated in FIGS. 3, 4, and 5, and the shorting bars in each pad part are not electrically connected with the shorting bars formed in an adjacent pad part region, a degree of testing flexibility is incurred. Therefore, test pins contact ends of all shorting bars formed in the pad region of the LC panel and then a test signal is applied thereto, so that the test can be performed for the entire active region in blocks of odd/even signal lines, odd/even gate lines and data lines by Red, Green and Blue pixels, or four gate lines and data lines by a first set of by a Red, Green and Blue pixels and a second set of by a Red, Green and Blue pixels. Also, a single desired type of gate pad part and data pad part can be selected such that a test can be performed on a specific block that corresponds to the selected gate pad part and data pad part.

For example, referring to FIG. 8, the second gate pad parts GC2 and GC3, and the third, fourth, fifth, and sixth data pad parts DC3, DC4, DC5, and DC6 are selected, and a test signal is applied to the shoring bars formed in the selected pad region, so that the test is performed for only a predetermined block (shaded block). As described above, the shorting bars are formed in the pad unit according to the present invention, so that line defect detection caused by signal delay is prevented and an operator can selectively perform the test for a desired set of blocks. As described above in detail, the shorting bars in the LC panel are independently formed in pad parts according to embodiments of the present invention such that testing flexibility can be improved. Also, the signal delay problem in the related art shorting bar test is resolved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
   gate pads on a first side of an insulating substrate;
   gate pad parts, which contain a sub-group of the gate pads;
   a plurality of gate shorting bars within the gate pad parts;
   data pads on a second side of the insulating substrate;
   data pad parts, which contain a sub-group of the data pads; and
   a plurality of data shorting bars within the data pad parts,
      wherein the plurality of gate shorting bars includes four shorting bars for each gate pad part, the four shorting bars respectively connect to four blocks of gate pads in each gate pad part,
      wherein the plurality of data shorting bars includes six shorting bars in each of the data pad parts, the six shorting bars respectively connect to six blocks of data pads in each data pad part,
      wherein the plurality of gate shorting bars in each of the gate pad parts are independent and separate from each other,
      wherein the plurality of gate shorting bars disposed adjacent to each other at the different gate pad parts are electrically disconnected from each other,
      wherein the plurality of data shorting bars in each of the data pad parts are independent and separate from each other,
      wherein the plurality of data shorting bars disposed adjacent to each other at the different data pad parts are electrically disconnected from each other.

2. The liquid crystal display device according to claim 1, wherein first three blocks of the six blocks of data pads respectively correspond to red, green and blue pixels, and second three blocks of the six blocks of data pads respectively correspond to red, green and blue pixels.

3. A method for testing a liquid crystal display device, comprising:
- contacting a plurality of gate shorting bars within gate pad parts in which each contains a sub-group of gate pads;
- contacting a plurality of data shorting bars within data pad parts in which each contains a sub-group of data pads; and
- testing the liquid crystal display device by applying a drive signal to at least one of the plurality of gate shorting bars and at least one of the plurality of data shorting bars,
  - wherein the plurality of gate shorting bars in each of the gate pad parts are independent and separate from each other,
  - wherein the plurality of gate shorting bars disposed adjacent to each other at the different gate pad parts are electrically disconnected from each other,
  - wherein the plurality of data shorting bars in each of the data pad parts are independent and separate from each other,
  - wherein the plurality of data shorting bars disposed adjacent to each other at the different data pad parts are electrically disconnected from each other.

4. The method according to claim 3, wherein the plurality of gate shorting bars includes two shorting bars in each of the gate pad parts such that a first shorting bar connects to the odd gate pads and a second shorting bar connects to the even gate pads, respectively.

5. The method according to claim 3, wherein the plurality of data shorting bars includes two shorting bars in each of the data pad parts such that a first shorting bar connects to the odd data pads and a second shorting bar connects to the even data pads, respectively.

6. The method according to claim 3, wherein the plurality of gate shorting bars includes four shorting bars for each gate pad part, the four shorting bars respectively connect to four blocks of gate pads in each gate pad part.

7. The method according to claim 3, wherein the plurality of data shorting bars includes three shorting bars in each of the data pad parts, the three shorting bars respectively connect to three blocks of data pads in each data pad part such that each of the three blocks of data pads respectively correspond to red, green and blue pixels.

8. The method according to claim 3, wherein the plurality of data shorting bars includes six shorting bars in each of the data pad parts, the six shorting bars respectively connect to six blocks of data pads in each data pad part such that a first three blocks of the six blocks of data pads respectively correspond to red, green and blue pixels, and second three blocks of the six blocks of data pads respectively correspond to red, green and blue pixels.

9. A method for manufacturing a liquid crystal display, comprising:
- forming gate electrodes and gate pads on a substrate;
- forming a plurality of gate shorting bars within gate pad parts in which each contains a sub-group of gate pads;
- forming thin film transistors and data pads; and
- forming a plurality of data shorting bars within data pad parts in which each contains a sub-group of data pads,
  - wherein the plurality of gate shorting bars includes four shorting bars for each gate pad part, the four shorting bars respectively connect to four blocks of gate pads in each gate pad part,
  - wherein the plurality of data shorting bars includes six shorting bars in each of the data pad parts, the six shorting bars respectively connect to six blocks of data pads in each data pad part, wherein a first three blocks of the six blocks of data pads respectively correspond to red, green and blue pixels, and a second three blocks of the six blocks of data pads respectively correspond to red, green and blue pixels,
  - wherein the plurality of gate shorting bars in each of the gate pad parts are independent and separate from each other,
  - wherein the plurality of gate shorting bars disposed adjacent to each other at the different gate pad parts are electrically disconnected from each other,
  - wherein the plurality of data shorting bars in each of the data pad parts are independent and separate from each other, wherein the plurality of data shorting bars disposed adjacent to each other at the different data pad parts are electrically disconnected from each other.

* * * * *